(12) United States Patent
Goyal et al.

(10) Patent No.: US 12,406,135 B2
(45) Date of Patent: Sep. 2, 2025

(54) ASSISTED REVIEW OF TEXT CONTENT USING A MACHINE LEARNING MODEL

(71) Applicant: ADOBE INC., San Jose, CA (US)

(72) Inventors: Navita Goyal, College Park, MD (US); Ani Nenkova Nenkova, Philadelphia, PA (US); Natwar Modani, Bengaluru (IN); Ayush Maheshwari, Kota (IN); Inderjeet Jayakumar Nair, Indore (IN)

(73) Assignee: ADOBE INC., San Jose, CA (US)

( * ) Notice: Subject to any disclaimer, the term of this patent is extended or adjusted under 35 U.S.C. 154(b) by 538 days.

(21) Appl. No.: 17/549,270

(22) Filed: Dec. 13, 2021

(65) Prior Publication Data
US 2023/0186667 A1   Jun. 15, 2023

(51) Int. Cl.
*G06F 40/205* (2020.01)
*G06F 40/20* (2020.01)
*G06F 40/279* (2020.01)
*G06N 20/00* (2019.01)
*G06N 3/044* (2023.01)
*G06N 3/08* (2023.01)

(52) U.S. Cl.
CPC ............ *G06F 40/205* (2020.01); *G06F 40/20* (2020.01); *G06F 40/279* (2020.01); *G06N 20/00* (2019.01)

(58) Field of Classification Search
CPC ...... G06F 40/205; G06F 40/20; G06F 40/279; G06N 20/00; G06N 3/044; G06N 3/045; G06N 3/0464; G06N 3/08
See application file for complete search history.

(56) References Cited

U.S. PATENT DOCUMENTS

| 2009/0327269 A1* | 12/2009 | Paparizos ........... G06F 16/3322 707/999.005 |
| 2017/0366568 A1* | 12/2017 | Narasimhan ........ H04L 63/1425 |
| 2021/0383070 A1* | 12/2021 | Hunter .................. G06F 40/103 |

FOREIGN PATENT DOCUMENTS

WO   WO-2022213197 A1 *  10/2022 ............. G06F 16/35

OTHER PUBLICATIONS

Angelidis, I., et al., "Named Entity Recognition, Linking and Generation for Greek Legislation", In JURIX, pp. 1-10 (Sep. 2018).
Bommarito, M.J. II, et al., "LexNLP: Natural language processing and information extraction for legal and regulatory texts", Preprint submitted to SSRN—Version 1.01, pp. 1-7 (Jun. 12, 2018).

(Continued)

*Primary Examiner* — Daniel C Washburn
*Assistant Examiner* — Penny L Caudle
(74) *Attorney, Agent, or Firm* — Shook, Hardy & Bacon L.L.P.

(57) ABSTRACT

Techniques described herein are directed to assisting review of documents. In one embodiment, one or more text segments and one or more subjects in a document are identified. A text segment in the document is associated with a corresponding subject identified in the document. The text segment is classified with a content type value corresponding to a relation of the text segment to the corresponding subject. Thereafter, information is provided for the text segment associated with the corresponding subject for display on a user interface. Such information can include a representation of the content type value for the text segment.

18 Claims, 11 Drawing Sheets

(56) References Cited

OTHER PUBLICATIONS

Borchmann, Ł., et al., "Contract discovery: Dataset and a few-shot semantic retrieval challenge with competitive baselines", arXiv preprint arXiv:1911.03911v2, pp. 15 (Oct. 8, 2020).
Chalkidis, I., et al., "Legal-Bert: The muppets straight out of law school", arXiv preprint arXiv:2010.02559v1, pp. 7 (Oct. 6, 2020).
Chalkidis, I., et al., "Extracting contract elements", ICAIL '17: Proceedings of the 16th edition of the International Conference on Articial Intelligence and Law, pp. 1-10 (Jun. 12-15, 2017).
Dragoni, M., et al., "Combining NLP approaches for rule extraction from legal documents", In 1st Workshop on Mining and REasoning with Legal texts (MIREL 2016), pp. 13 (Dec. 2016).
Dua, D., et al., "DROP: A reading comprehension benchmark requiring discrete reasoning over paragraphs", arXiv preprint arXiv:1903.00161v2, pp. 12 (Apr. 16, 2019).
Gregory, K., et al., "Siamese neural networks for one-shot image recognition", In ICML deep learning workshop, pp. 8 (2015).
Hendrycks, D., et al., "Cuad: An expert-annotated nlp dataset for legal contract review", 35th Conference on Neural Information Processing Systems (NeurIPS 2021) Track on Datasets and Benchmarks, arXiv preprint arXiv:2103.06268v2, pp. 15 (Nov. 8, 2021).
Jiang, C., et al., "Learning numeral embedding", arXiv preprint arXiv:2001.00003v1, pp. 16 (Dec. 28, 2019).
MacQueen, J., "Some methods for classification and analysis of multivariate observations", Proceedings of the fifth Berkeley symposium on mathematical statistics and probability, vol. 1, No. 14, pp. 281-297 (1967).
Miller, G. A., "WordNet: a lexical database for English", Communications of the ACM, vol. 38, No. 11, 39-41 (Nov. 1995).
Schuster, M., and Paliwal, K.K., "Bidirectional recurrent neural networks", IEEE transactions on Signal Processing, vol. 45, No. 11, pp. 2673-2681 (Nov. 1997).
Tecuci, D.G., et al., "DICR: AI Assisted, Adaptive Platform for Contract Review", In Proceedings of the AAAI Conference on Artificial Intelligence, vol. 34, No. 09, pp. 13638-13639 (2020).
Wallace, E., et al., "Do nlp models know numbers? probing numeracy in embeddings", arXiv preprint arXiv:1909.07940v2, pp. 12 (Sep. 18, 2019).
Wolf, T., et al., "Huggingface's transformers: State-of-the-art natural language processing", arXiv preprint arXiv:1910.03771v3, pp. 11 (Oct. 16, 2019).

* cited by examiner

ASSISTED REVIEW OF TEXT CONTENT USING A MACHINE LEARNING MODEL

BACKGROUND

Text content, such as specifications, contracts and descriptions, are often important for communicating requirements, obligations and other information. Frequently, multiple users are involved in developing and reviewing text content. Different users can have different roles with respect to the text content, such as different parties to a contract or different contributors to a specification. Review of text content, however, can be tedious, time-consuming, and prone to errors. For example, text content may include distinct language characteristics in specifications or legal text, such as specialized vocabulary, peculiar syntax, and/or domain specific semantic knowledge. Further, as such documents are often long, the review of such dense content is exacerbated.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the disclosed technology described herein are generally directed to systems, methods, and computer storage media for, among other things, intelligent assisted review of text content that can help a contributor to the content focus on portions of the content that are most relevant to that contributor.

In certain examples, the disclosed technology analyzes text content to identify different entities referenced within the text content of a contract. For example, the disclosed technology can analyze a contract to identify parties to the contract along with aliases associated with each of the parties. The disclosed technology can also identify segments of text, such as clauses, that define the rights and responsibilities typically contained in contract clauses and associate the segments with the parties by extracting mappings between parties and aliases and present to a reviewing user those segments of the contract that are relevant to the reviewing user.

In particular examples, the disclosed technology can utilize a reference corpus, such as contracts previously used in an industry or previously executed by the reviewing user, to determine if the clauses in a contract are similar to the clauses which have been agreed to in the past by the reviewing user. Some examples can flag the clauses that deviate from similar clauses in the reference corpus or collection. The deviations can be in terms of the use of language that is not typically used in reference corpus, in terms of language that is absent, or in terms of quantitative values (for example, amounts, percentages, or duration, etc.).

In specific examples, the disclosed technology can identify similar clauses from the reference corpus. The similar clauses can be prioritized based on the frequency of their occurrence in reference corpus (exactly or approximately), and also are selected such that there is diversity in the retrieved similar clauses. The similar clauses can be utilized to suggest different or additional language or terms for a clause to the reviewing user based on language and terms from clauses or segments in the reference corpus that are identified as similar.

Certain examples can utilize a similarity engine based on similarity identification models for identifying segments in a reference corpus that are similar to segments in text content under review. The similarity identification models can be generated by using the reference corpus as a training dataset for training a machine learning model. A segment from the text content can be submitted to a similarity engine to identify similar segments from the reference corpus. The identified segments can be utilized to provide suggested revisions to the segment from the text content.

In particular examples, numeric ranges in the reference corpus can be mapped to representative tokens and replaced by the representative tokens before training a similarity identification model with the reference corpus augmented with tokens. Numeric ranges in the text content can also be replaced by representative tokens before submittal to the similarity identification model.

BRIEF DESCRIPTION OF THE DRAWINGS

The technology described herein is described in detail below with reference to the attached drawing figures, wherein.

DETAILED DESCRIPTION

Figure 1A:
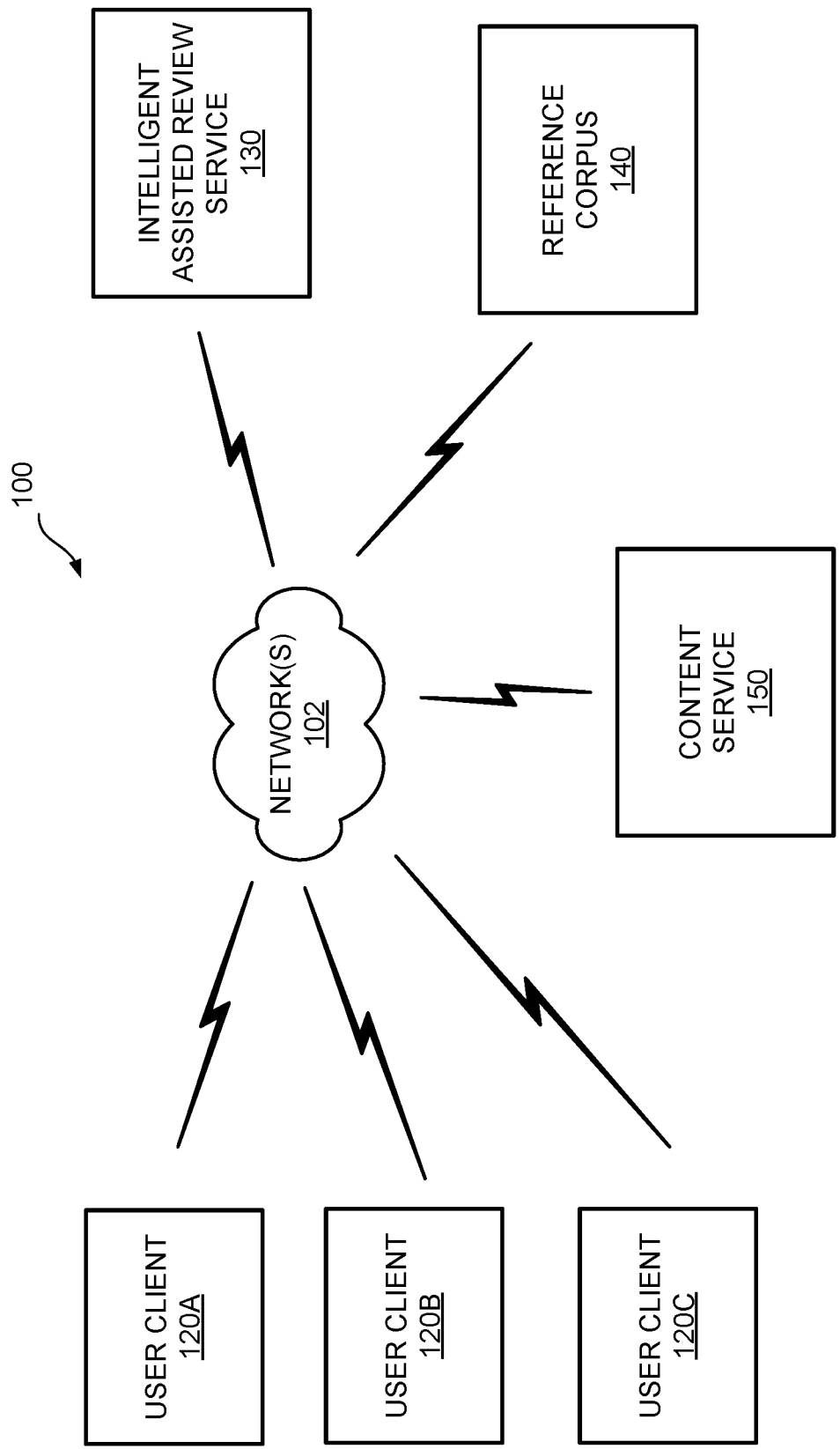
FIG. 1A is a block diagram of an exemplary system suitable for use in implementing aspects of the technology described herein.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Text content development and review is an important function for many entities. Specifications are typically used to define the requirements and architecture for a wide array of goods, such as machines, structures, or applications, and services, such as medical, financial and content streaming services. Contracts typically define legal binding rights and responsibilities among parties to a contract.

Often, text content can include a large amount of complex text that involves contribution and review from multiple different users with different roles respecting the content. For example, with regard to specifications, different contributers to a specification are oftentimes responsible for different portions of the specification. With regard to contracts, different involved parties may review the contract and oftentimes may propose amendments to various clauses as part of the negotiation process. Contributing and review of complex text content can be challenging. In some conventional solutions, such as word processing applications, tools are provided to track and comment on changes to text content. However, these tools typically do little to assist a particular user to focus on and develop the portions of the text content that are most relevant to that particular user.

As such, one aspect of the technology described herein can facilitate intelligent assisted review of text content. Advantageously, and in contrast to conventional solutions, one aspect of the disclosed technology can identify boundaries for segments in a natural language text document and determine subjects in the text document. Text segments can be associated with a corresponding subject and classified with a content type value corresponding to a relation of the text segment to the corresponding subject. In some examples, aliases for the subjects that appear in the text document can be identified and mapped to a corresponding subject. This mapping can be used for identifying text segments that utilize an alias and can be associated with a subject corresponding to the alias. Information for the text segments associated with a corresponding subject, including a representation of the content type value, can be provided for display on a user interface associated with the corresponding subject.

In another aspect, the disclosed technology can identify segments from a reference corpus of text content that are similar to a text segment of the natural language text document. Based on the identified similar segments from the reference corpus of text content, the disclosed technology can determine whether the text segment deviates from the identified similar segments from the reference corpus. When the text segment deviates from the identified similar segments, a representation of deviation of the text segment can be included in the information provided for display. The representation of deviation of the text segment can include portions of the identified similar segments to provide suggested language to a reviewing user of the text document. The representation of deviation of the text segment can also be information or statistics derived from the identified similar segments. In certain examples, similar segments in the reference corpus can be identified by submitting the text segment to a similarity identification model trained on the reference corpus.

In yet another aspect, the disclosed technology can identify numerical text in the reference corpus and replace the numerical text with a corresponding token. The reference corpus augmented with the tokens corresponding to numerical text can be used to train the similarity identification model. Numerical text in text segments of the text document can also be identified and replaced with corresponding tokens. Similar segments from the reference corpus can be identified by submitting a text segment with numerical text replaced with a corresponding token to the similarity identification model trained using the augmented reference corpus. When the numerical text deviates from the identified similar segments, the information provided for display can include a representation of the deviation of the numerical text, which can include numerical text from the identified similar segments or information derived from the identified similar segments, such as average, median, minimum or maximum values from one or more of the identified similar segments.

Note that certain embodiments, in accordance with some aspects of the disclosed technology, process the text content by one or more machine learning models that are trained to identify similarity between text segments of the text content and segments of a reference corpus or collection. For example, the machine learning models can process the text content and reference corpus to determine one or more clauses, keywords and/or other specialized language characteristics of the text content. The system can identify similar segments from the reference corpus and use the similar segments to identify deviation from the reference corpus and generate suggestions for review and revision of the text content.

Advantageously, the disclosed technology can effectively and efficiently provide information regarding segments of a text document for display to a user that are relevant to that user, which can reduce time and resources consumed by a user in reviewing portions of a document that are not relevant to the user. Improving a user's focus on those portions of a document most relevant to a user can also reduce iterations of review cycles and time and resources utilized in additional review cycles.

Further, the disclosed technology can advantageously provide guidance to assist a user in recognizing differences between text content under review and other similar text content from a reference corpus and to suggest replacement text content from the reference corpus, which can also reduce time and resources utilized in reviewing and revising a document and improve the content of a final document.

Having briefly described an overview of aspects of the present technology, various terms used throughout this description are provided. Although more details regarding various terms are provided throughout this description, general descriptions of some terms are included below to provider a clearer understanding of the ideas disclosed herein:

The term "text content" generally refers to natural language text documents, such as specifications, contracts, or web pages. "Text segments" or "segments" generally refers to clauses or other portions of the text content or reference corpus. "Subjects" generally refers to distinct entities that can be identified in the text content, such as parties to a contract or contributors to a specification. "Similar segments" in the reference corpus generally refers to segments from the reference corpus that meet a threshold similarity level to a segment from the text content. "Reference corpus" generally refers to a collection of text natural language documents or content. "Numerical text" generally refers to text incorporating numbers, such as a calendar date, monetary amounts, percentage amounts, paragraph number or numerical range.

Overview of Exemplary Environments for Intelligent Assisted Review of Text Content Referring initially to FIG. 1A, FIG. 1A is a block diagram of an exemplary network environment 100 suitable for use in implementing embodiments described herein is shown. Generally, the system 100 illustrates an environment suitable for intelligent assisted review of text content. Among other things, embodiments described herein effectively and efficiently provide a service that provides information regarding segments of a text document for display to a user that are relevant to the user. In this regard, the system receives text content, automatically identifies subjects and associated aliases in the text content, segments the text content, associates the segments of the text content with a corresponding subject, and provides information regarding the segments of text content for display to a user associated with the corresponding subject. The information provided for display can include representations of deviation of a text segment from similar segments of a reference corpus, where the representations of deviation can include suggested text, including numerical suggestions, based on the similar segments from the reference corpus.

The network environment 100 includes user clients 120, intelligent assisted review service 130, reference corpus 140 and content service 150 that can communicate with one another through network 102, which can include, for example, a local area network (LAN), a wide area network (WAN), the Internet, a cellular network, a peer-to-peer (P2P) network, a mobile network, or a combination of networks.

The network environment 100 shown in FIG. 1 is an example of one suitable network environment and is not intended to suggest any limitation as to the scope of use or functionality of embodiments disclosed throughout this document. Neither should the exemplary network environment 100 be interpreted as having any dependency or requirement related to any single component or combination of components illustrated therein.

In some examples, the user clients 120 and intelligent assisted review service 130 will be in communication via a mobile network or the Internet, and the content service 150 will be in communication with intelligent assisted review service 130 via a local area network. In some further embodiments, although the environment 100 is illustrated with a network, one or more of the components will directly communicate with one another, for example, via HDMI (high-definition multimedia interface), and DVI (digital visual interface). Alternatively, one or more components will be integrated with one another, for example, at least a portion of the intelligent assisted review service 130 can be integrated with content service 150 and reference corpus 140 can be integrated with intelligent assisted review service 130.

User clients 120 can be any kind of computing device capable of communicating with intelligent assisted review service 130 and displaying information from service 130 via a user interface. For example, in an embodiment, a user client 120 can be a computing device such as computing device 500, as described above with reference to FIG. 5. In embodiments, a user client 120 can be a personal computer (PC), a laptop computer, a workstation, a mobile computing device, a PDA, a cell phone, or the like.

A user device 120 can include one or more processors and one or more computer-readable media. The computer-readable media includes computer-readable instructions executable by the one or more processors. The instructions are embodied by one or more applications, such as an application that is found on, a part of, or configured to use intelligent assisted review service 130. The application(s) can generally be any application capable of facilitating display, review or revision of text content. In some implementations, the application(s) comprises a web application, which can run in a web browser, and could be hosted at least partially server-side (e.g., via intelligent assisted review service 130 or content service 150). In addition, or instead, the application(s) can comprise a dedicated application. In some cases, the application is integrated into the operating system (e.g., as a service).

In some examples, the user client 120 can be a client device on a client-side of the operating environment 100, while the intelligent assisted review service 130, reference corpus 140 or content service 150 can be on a server-side of the operating environment 100. In some embodiments, the intelligent assisted review service 130, reference corpus 140 or content service 150 comprise server-side software designed to work in conjunction with client-side software on user client 120 so as to implement any combination of the features and functionalities discussed in the present disclosure. This division of the operating environment 100 is provided to illustrate one example of a suitable environment, and it is noted there is no requirement for each implementation that any combination of the user client 120, intelligent assisted review service 130, reference corpus 140 or content service 150 to remain as separate entities.

Figure 1B:
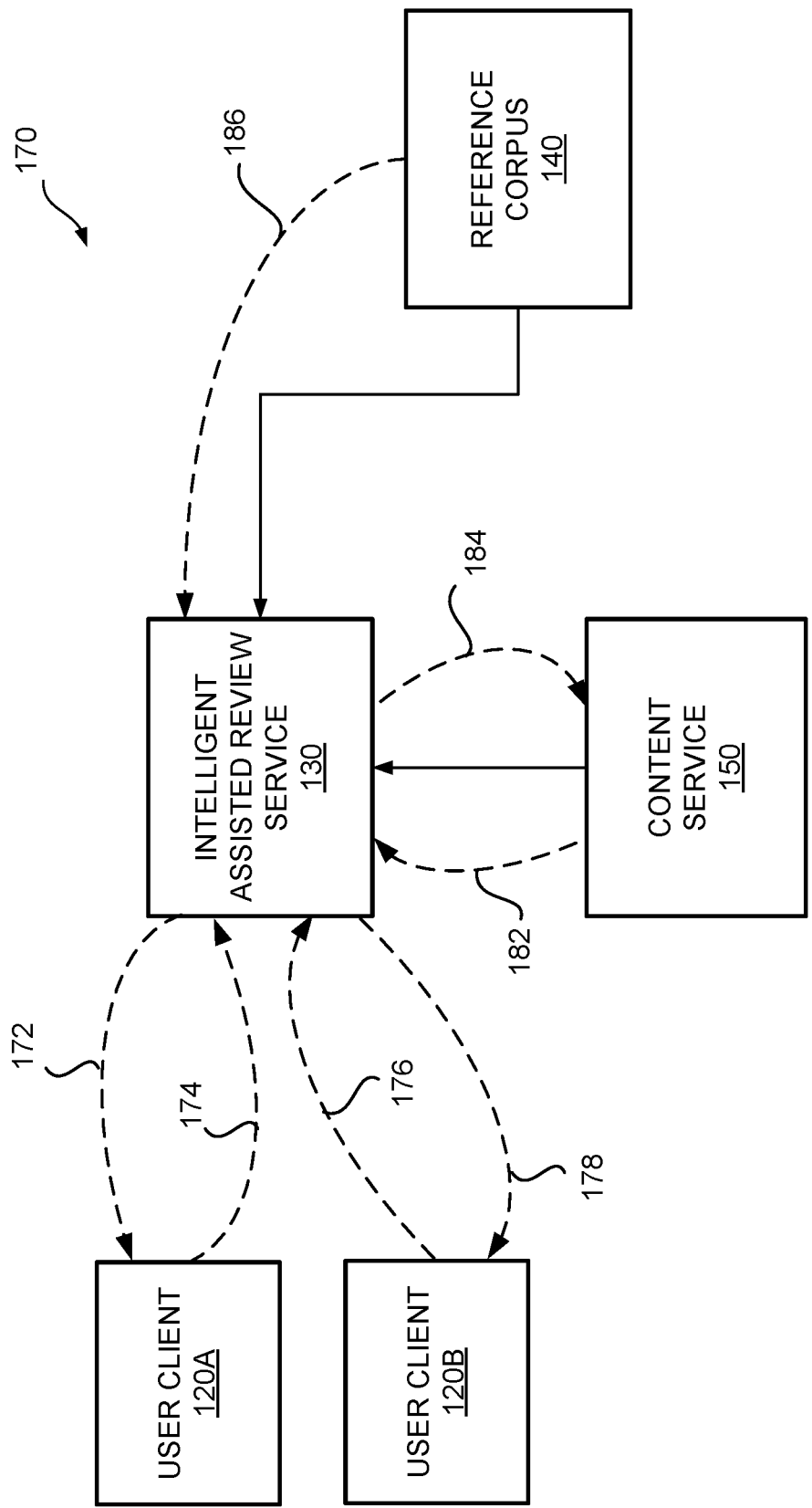
FIG. 1B is a block diagram illustrating an example of interactions in the system of FIG. 1A for intelligent assisted review in accordance with aspects of the technology described herein.

FIG. 1B is a block diagram illustrating an example of interactions in the system of FIG. 1A for intelligent assisted review in accordance with aspects of the technology described herein. A user client 120, as described herein, is operated by an individual or entity—such as a reviewer or contributor—to create, view and revise content, such as text content provided by content service 150. As can be appreciated, a reviewer associated with a subject (e.g., a party) initially uses one of the user clients 120 to interact with the intelligent assisted review service 130 to select, modify and/or generate text content at 174 or 176 to be provided at 172 or 178 for presentation to one or more users of user clients 120. Selected, modified and/or generated text content (collectively referred to herein as "the text content") can be provided at 182 to the intelligent assisted review service 130 by content service 150. The intelligent assisted review service 130 can process the text content for display on a user interface of one or more of user clients 120.

Figure 2A:
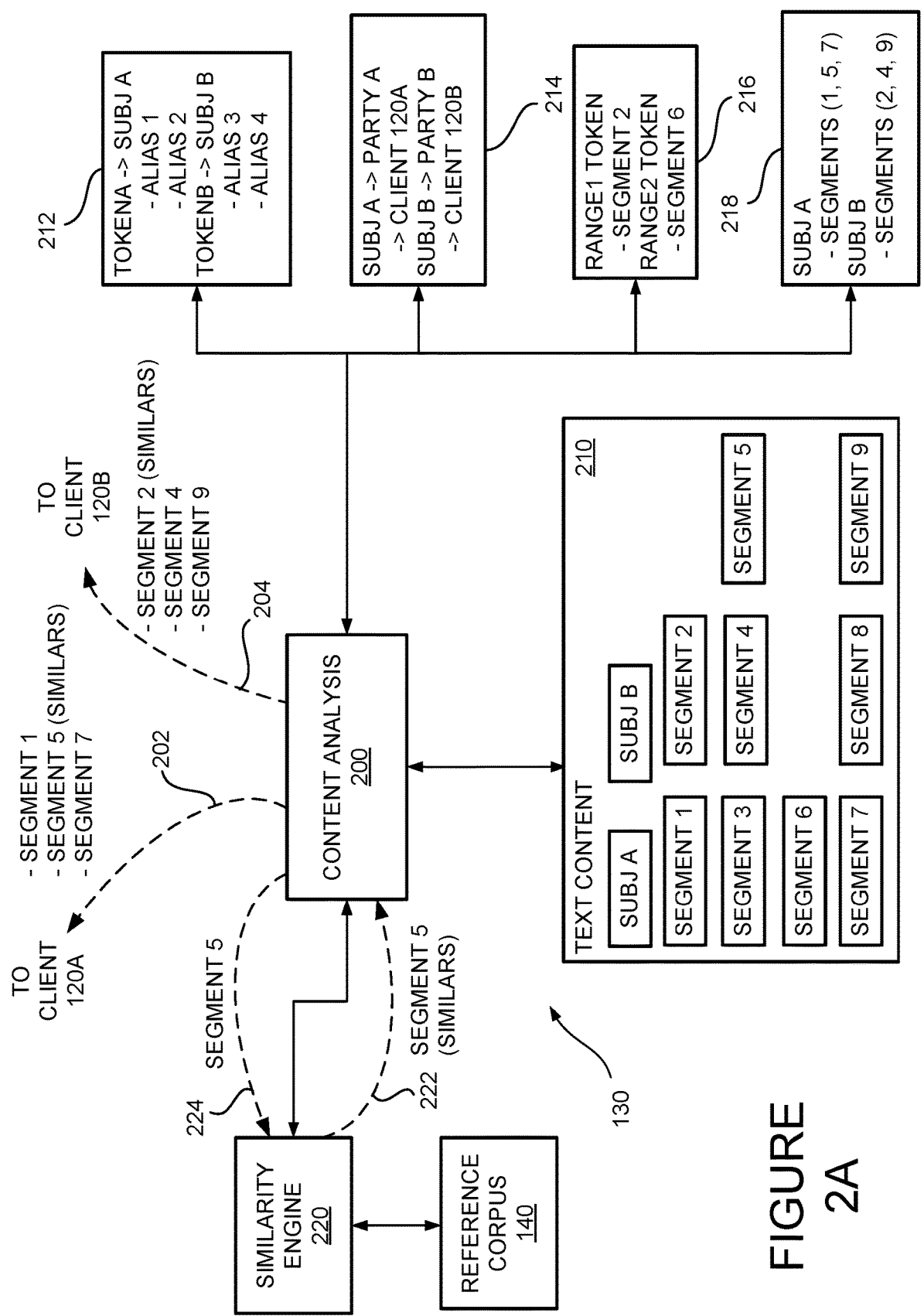
FIG. 2A is a functional block diagram illustrating an example of an architecture for intelligent assisted review in accordance with aspects of the technology described herein.

FIG. 2A is a functional block diagram illustrating one example of an architecture for intelligent assisted review 130 in accordance with aspects of the technology described herein. In the example architecture of FIG. 2A, content analysis module 200 analyzes text content 210. Content analysis module 200 identifies subjects SUBJ A and SUBJ B in text content 210 and identifies boundaries for text segments SEGMENT 1 through SEGMENT 9.

Content analysis module 200 maps a first token TOKENA to SUBJ A and maps aliases ALIAS 1 and ALIAS 2 to TOKENA. Similarly, content analysis module 200 creates a mapping 212 that maps another token TOKENB to SUBJ B and maps aliases ALIAS 3 and ALIAS 4 to TOKENB. For example, for a contract, content analysis module 200 can identify subjects SUBJ A and SUBJ B from a preamble of the contract and also determine that the subjects map to certain aliases, such as SUBJ A mapping to "EMPLOYER" and SUBJ B mapping to "EMPLOYEE."

In addition, mapping 214 can map the subjects to a party and corresponding user client 120. In this example, SUBJ A maps to PARTY A and corresponding user client 120A while SUBJ B maps to PARTY B and corresponding user client 120B. Mapping 214 can be used to identify a user client that is provided with information to display to a user corresponding to SUBJ A and a user corresponding to SUBJ B, such as two different reviewers of a text document with different roles with respect to text content 210, e.g., SUBJ A mapping to user client 120A and SUBJ B mapping to user client 120B.

Content analysis module 200 can also create numerical text to token mapping 216. In certain examples in accordance with particular aspects of the disclosed technology, numerical text within text content 210 and reference corpus 140 can be identified and replaced with a corresponding token representing the numerical text. This replace can improve the similarity identification process involving similarity engine 220.

As described herein, in one aspect of the disclosed technology, content analysis 200 can associate segments of text content 210 with a corresponding subject to which a segment is relevant, which is indicated in segment mapping 218. For example, segments relating to entitlements or obligations with respect to an employer in a contract, e.g., SUBJ A, can be identified for display via a user interface of user client 120A associated with SUBJ A in mapping 214. Likewise, segments relating to rights or obligations of SUBJ B can be identified for display via a user interface of user client 120B associated with SUBJ B in mapping 214.

In the example shown, SEGMENTS 1, 5 and 7 of text content 210 are associated with SUBJ A in segment mapping 218 and information related to these segments is provided to user client 120A at 202 for display to a user associated with the employer. Likewise, SEGMENTS 2, 4 and 9 relating to SUBJ B, e.g., rights or obligations of an employee, can be identified in mapping 218 for display via a user interface of user client 120B associated with SUBJ B.

As is also described herein, the information provided for display to a user can include information regarding segments in reference corpus 140 that are similar to a segment of text content 210. In the example of FIG. 2A, at 224, content analysis module 200 submits SEGMENT 5 to similarity engine 220 to identify one or more segments of reference corpus 140 that are similar to SEGMENT 5. At 222, similarity engine 220 returns similar segments SIMILARS for SEGMENT 5 to content analysis module 200 and at least a portion of the SIMILARS for SEGMENT 5 are provided to user client 120A for display. Likewise, similar segments for SEGMENT 2 can be obtained from similarity engine 220 and included information provided to user client 120B associated with SUBJ B.

Figure 2B:
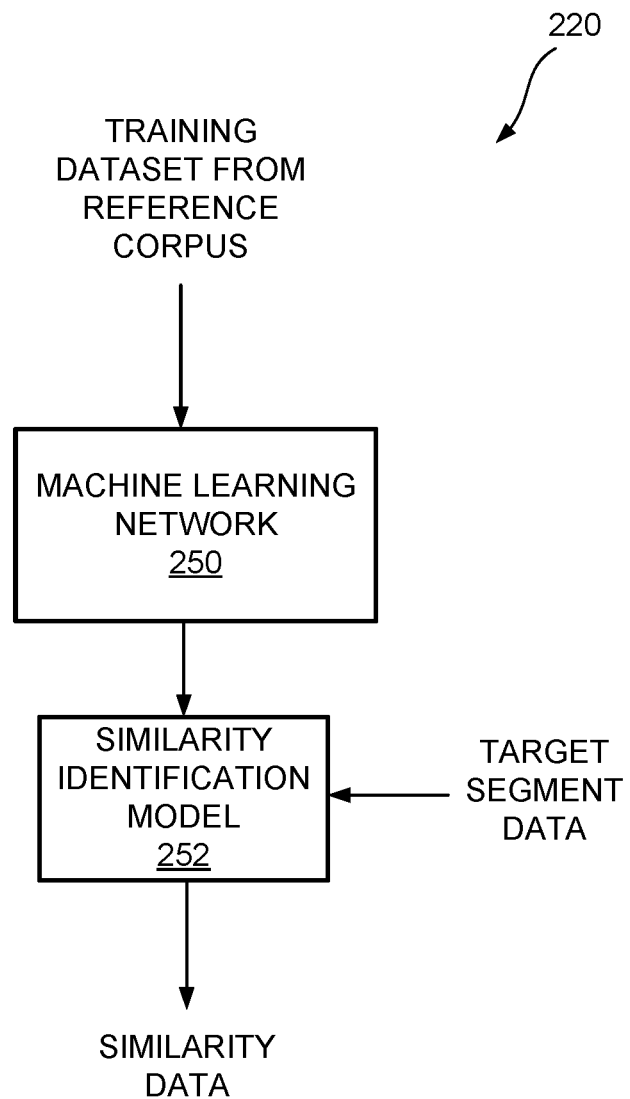
FIG. 2B is a functional block diagram illustrating an example of an architecture for generating a similarity identification model and identifying similar segments of a reference corpus in accordance with aspects of the technology described herein.

The processing performed by similarity engine 220 in intelligent assisted review service 130 can include an array of methods for identifying similarity of text segments. In one example, similarity engine 220 can identify similar segments by processing text segments from text content 210 with one or more machine learning (ML) models trained using a training dataset obtained at 186 from reference corpus 140. FIG. 2B is a functional block diagram illustrating one example of an architecture for similarity engine 220 of FIG. 2A for identifying similar segments from reference corpus 140. The example shown utilizes a similarity identification model 252 generated by machine learning network 250 trained using reference corpus 140 as a training dataset for identifying segments of reference corpus 140, e.g., SIMILARITY DATA, that are similar to a target segment of text content, e.g., SEGMENT DATA, in accordance with aspects of the technology described herein.

Generally, a ML model is a neural network(s) that can model complex non-linear relationships by generating hidden vector outputs along a sequence of inputs, such as reference corpus 140. In particular, the ML model can include a model of interconnected digital neurons that can approximate complex functions and generate outputs—such as similarity analysis—based on reference corpus 140 as a training dataset provided to the ML model. The ML model can include one or more deep learning models, including convolutional neural networks, recurrent neural networks, deep neural networks, and deep stacking networks, to name a few examples. The ML model includes or otherwise makes use of one or more machine learning algorithms to learn from training data, e.g., reference corpus 140. In other words, the ML model can include an algorithm that implements deep learning techniques such as machine learning to attempt to model high-level abstractions in data. An example implementation includes a convolutional neural network including convolutional layers, pooling layers, and/or other layer types.

Exemplary Implementations of the Present Disclosure

As described, various implementations can be used in accordance with the disclosed technology as described herein. FIGS. 3A-C and 4A-C illustrate examples of processes and sub-processes for intelligent assisted review in accordance with different aspects of the disclosed technology. The methods described in FIGS. 3A-C and 4A-C can be performed by a computer device, such as device 500 described below. The flow diagrams represented in FIGS. 3A-C and 4A-C are intended to be exemplary in nature and not limiting.

Figure 3A:
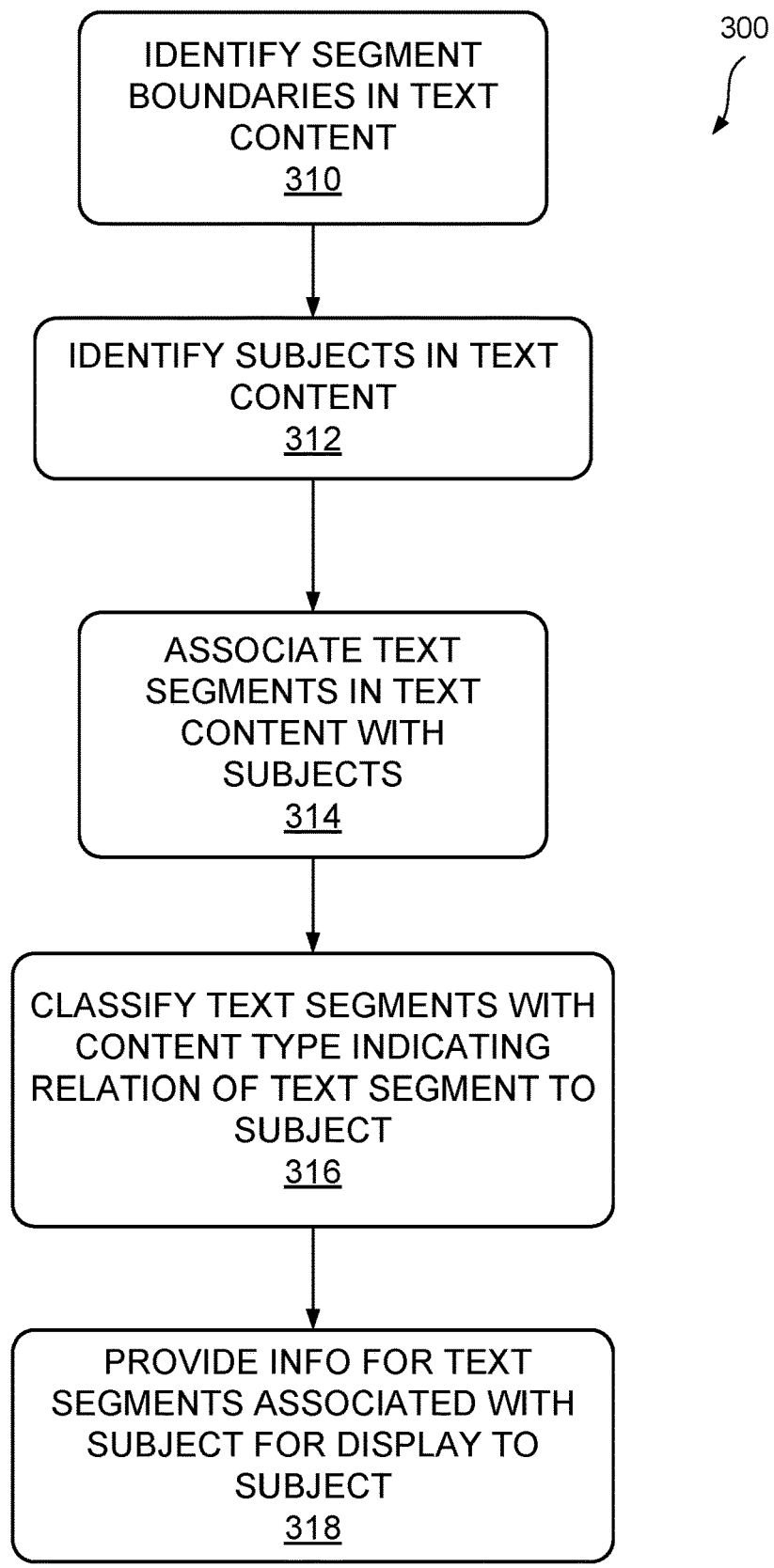
FIG. 3A is a control flow diagram illustrating an example of a process for intelligent assisted review in accordance with aspects of the technology described herein.

Turning initially to method 300 of FIG. 3A, method 300 is directed to one implementation of intelligent assisted review, in accordance with certain aspects of the disclosed technology. Initially, the method 300, at 310, involves identifying text segment boundaries in text content, such as text content 210 in FIG. 2A. At 312, subjects are identified in the text content, such as the contributors to a specification or the parties to a contract as identified in a preamble of the contract.

At 314, some of the text segments in the text content can be associated with one of the subjects identified in the text content. At 316, the text segments associated with one of the subjects can be classified with a content type value indicating a relation of the text segment to a subject. For example, in a specification, a subsection of a specification can be classified as a contribution required from one subject and as a segment for review by another subject. In another example, segments of a contract can represent rights or obligations of a subject.

The classification of a content type in 316 can be performed utilizing a mapping of language to content type based on the general nature and structure of a document. For example, the mapping for a contract document can be created based on distinct language characteristics in legal texts, such as specialized vocabulary, specific syntax and domain specific semantic knowledge and provided for use in classification of text segments in contracts. The mapping can be created by subject matter experts or subject matter experts in concert with machine learning models.

In one contract document mapping example, terms of effect in a text segment (e.g. verbs such as deliver, provide, pay, notify, defend, indemnify or warranty) that typically give rise to an entitlement, obligation or prohibition are identified and the relative position of a subject to a term of effect is used to determine the type value, e.g. entitlement or obligation, with respect to the subject. In this example, a text segment such as "[w]e will deliver product to you on the first of each month" can be classified as an obligation type value for the subject associated with the alias "we" and an entitlement type value for the subject associated with the alias "you" as used in the text segment.

At 318, information for text segments associated with a subject can be provided to a user client for display to a subject. The information provided for display can include some or all of a text segment associated with a subject as well as the classification type of the text segment.

Figure 3B:
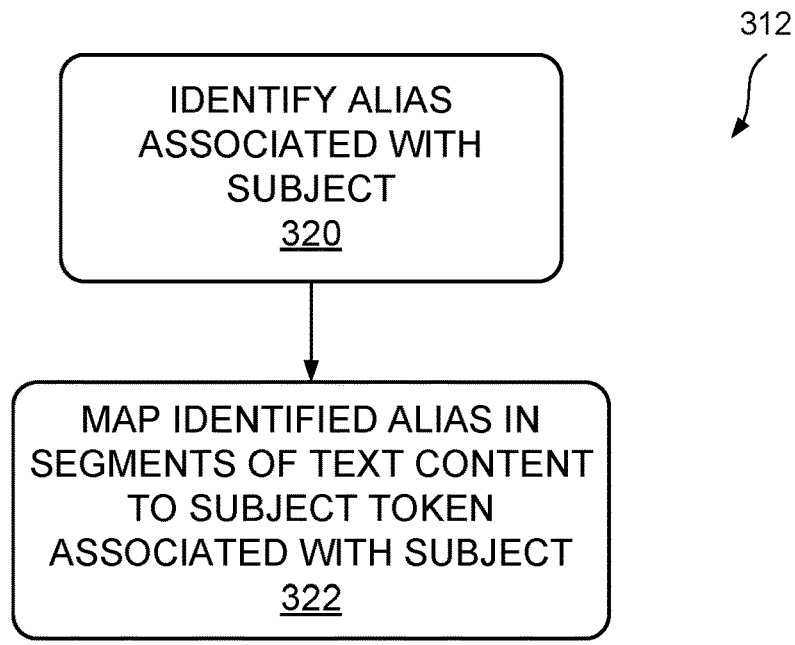
FIG. 3B is a control flow diagram illustrating an example of a process for identifying and mapping aliases to subjects in accordance with aspects of the technology described herein.

FIG. 3B is a control flow diagram illustrating one example of a process within operation 312 of FIG. 3A for identifying and mapping aliases to subjects in accordance with aspects of the technology described herein. At 320, aliases for subjects in the text content are identified, e.g., SELLER as an alias for SUBJ A or BUYER as an alias for SUBJ B. At 322, the aliases identified in segment of text content are mapped to a subject token associated with one of the subjects. In this approach, the text segments that utilize an alias to reference a subject can be associated with the subject and information for these text segments provided to a user client 120 for display to the subject.

Figure 3C:
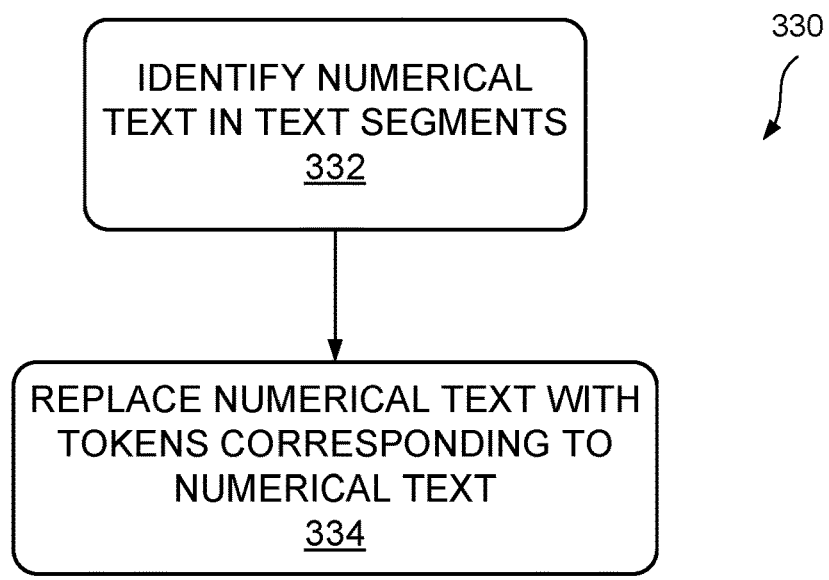
FIG. 3C is a control flow diagram illustrating an example of a process for identifying numerical text and replacing the numerical text with tokens in accordance with aspects of the technology described herein.

FIG. 3C is a control flow diagram illustrating one example of a process 330 for identifying numerical text in text content and the reference corpus and replacing the numerical text with tokens in accordance with certain aspects of the disclosed technology. As described herein, numerical text in text segments of text content and the reference corpus can be identified and replaced with tokens corresponding to the numerical text. Replacing the numerical text with tokens can improve the accuracy of identifying similar text segments between the text content and reference corpus.

At 332, numerical text, such as dates, paragraph numbers, amounts or numerical ranges, can be identified in the segments of the text content. At 334, the identified numerical text is replaced with tokens corresponding to the numerical text. Thereafter, text segments with tokens corresponding to numerical text can be submitted to a similarity identification model trained using the reference corpus with tokens corresponding to numerical text, as described herein with respect to FIG. 4C.

Figure 4A:
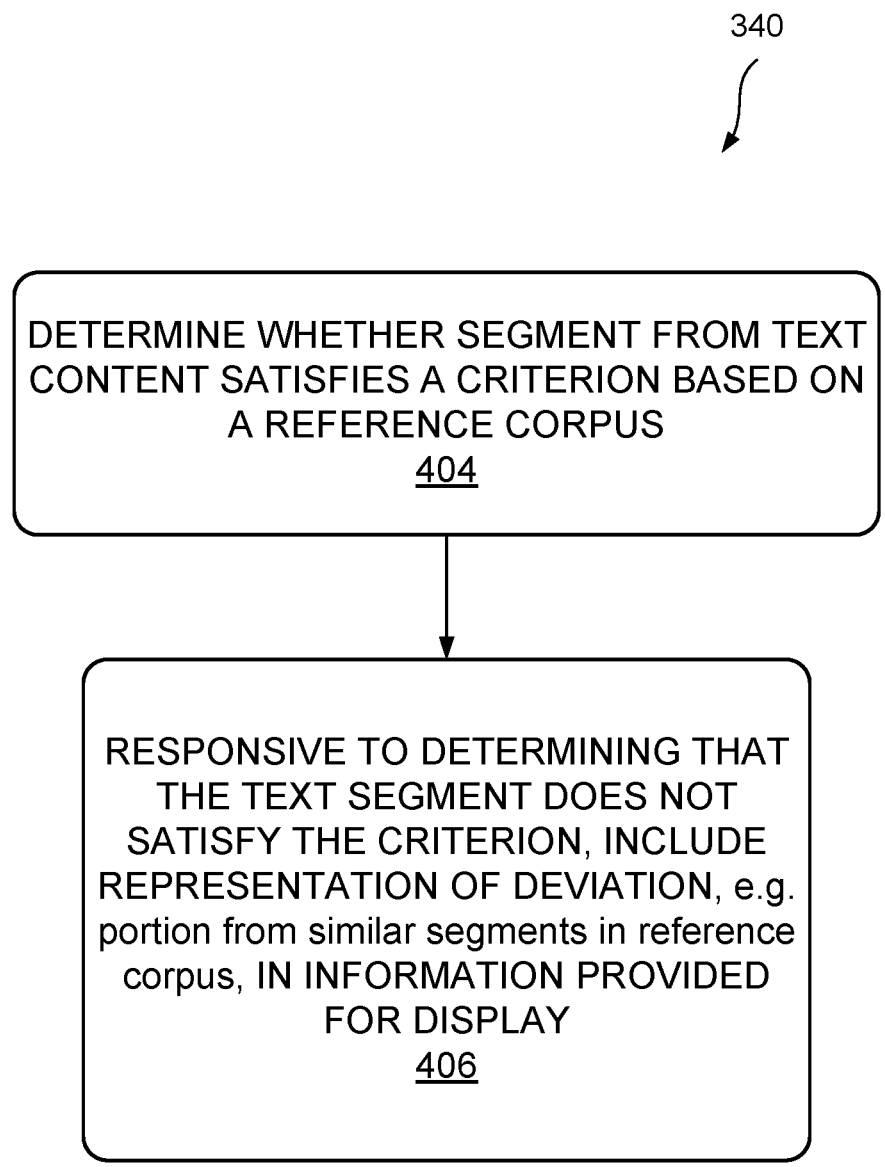
FIG. 4A is a control flow diagram illustrating an example of a process for identifying similar segments in a reference corpus in accordance with aspects of the technology described herein.

FIG. 4A is a control flow diagram illustrating one example of a process 340 for identifying similar segments in a reference corpus in accordance with particular aspects of the disclosed technology. At 404, a determination is made as to whether the segment from the text content satisfies a criterion based a reference corpus. For example, if a similarity score between the text segment from the text content and a similar segment from the reference corpus meets a threshold level, then the segment from the text satisfies a criterion.

At 406, responsive to determining that the text segment does not satisfy the criterion, a representation of the deviation, e.g., portions of text from the similar segment or segments from the reference corpus, can be included in the information provided for display to a user client corresponding to a subject associated with the text segment. For example, the representation of the deviation can include language or numerical ranges from the similar segment that are different from the text segment.

Figure 4B:
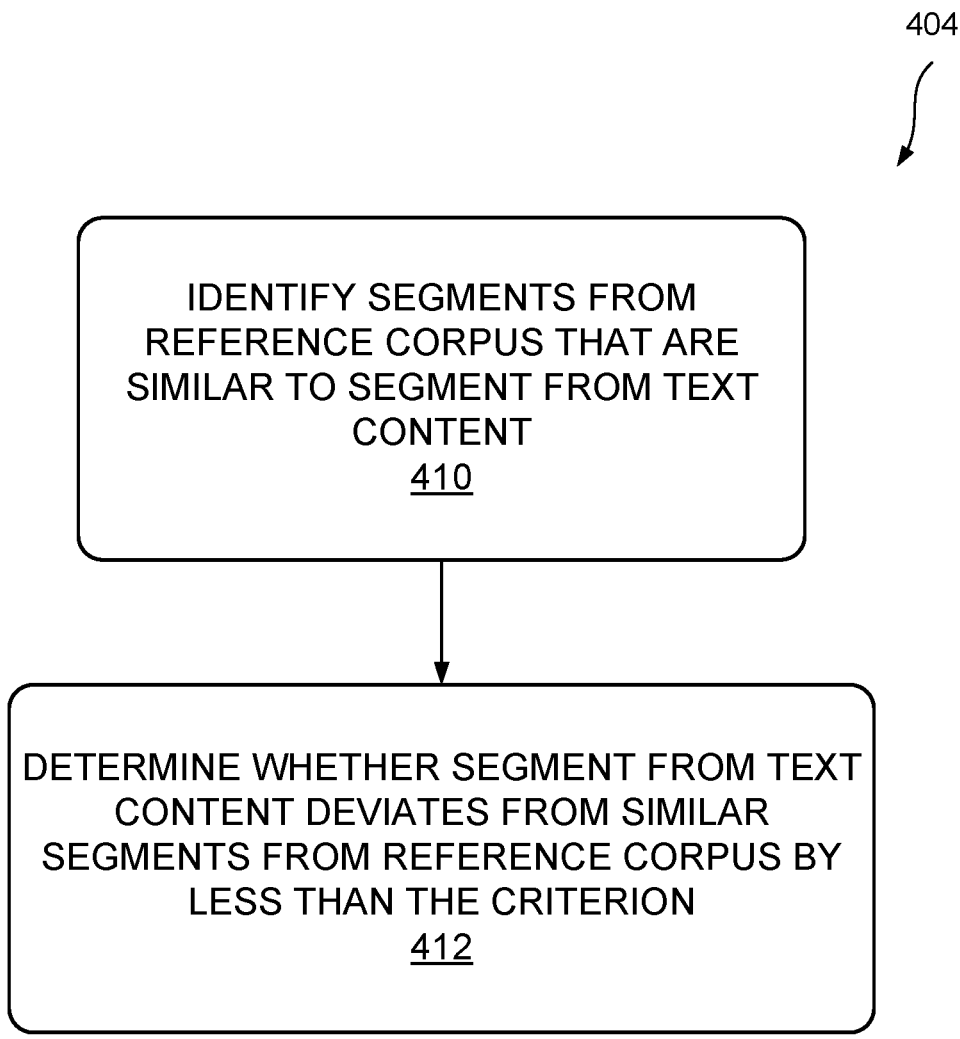
FIG. 4B is a control flow diagram illustrating an example of a particular implementation of the processing for identifying similar segments in a reference corpus in accordance with aspects of the technology described herein.

FIG. 4B is a control flow diagram illustrating an example of a particular implementation of operation 404 of FIG. 4A for the determining with a segment satisfies a criterion based on a reference corpus in accordance with aspects of the technology described herein. In this example, as described herein, a text segment from the text content, e.g., text content 210, can be submitted, at 410, to a similarity engine, e.g., similarity engine 220, to identify segments from the reference corpus that are similar to the text segment from the text content. At 412, a determination is made as to whether the segment from the text content deviates from the similar segments identified from the reference corpus. For example, if a similarity score between the text segment from the text content and a similar segment from the reference corpus meets a threshold level, then the differences between the text segment and the similar segment can be determined to be a deviation. A representation of the deviation can include the differences in text or numerical ranges between the text segments and the similar segment.

Figure 4C:
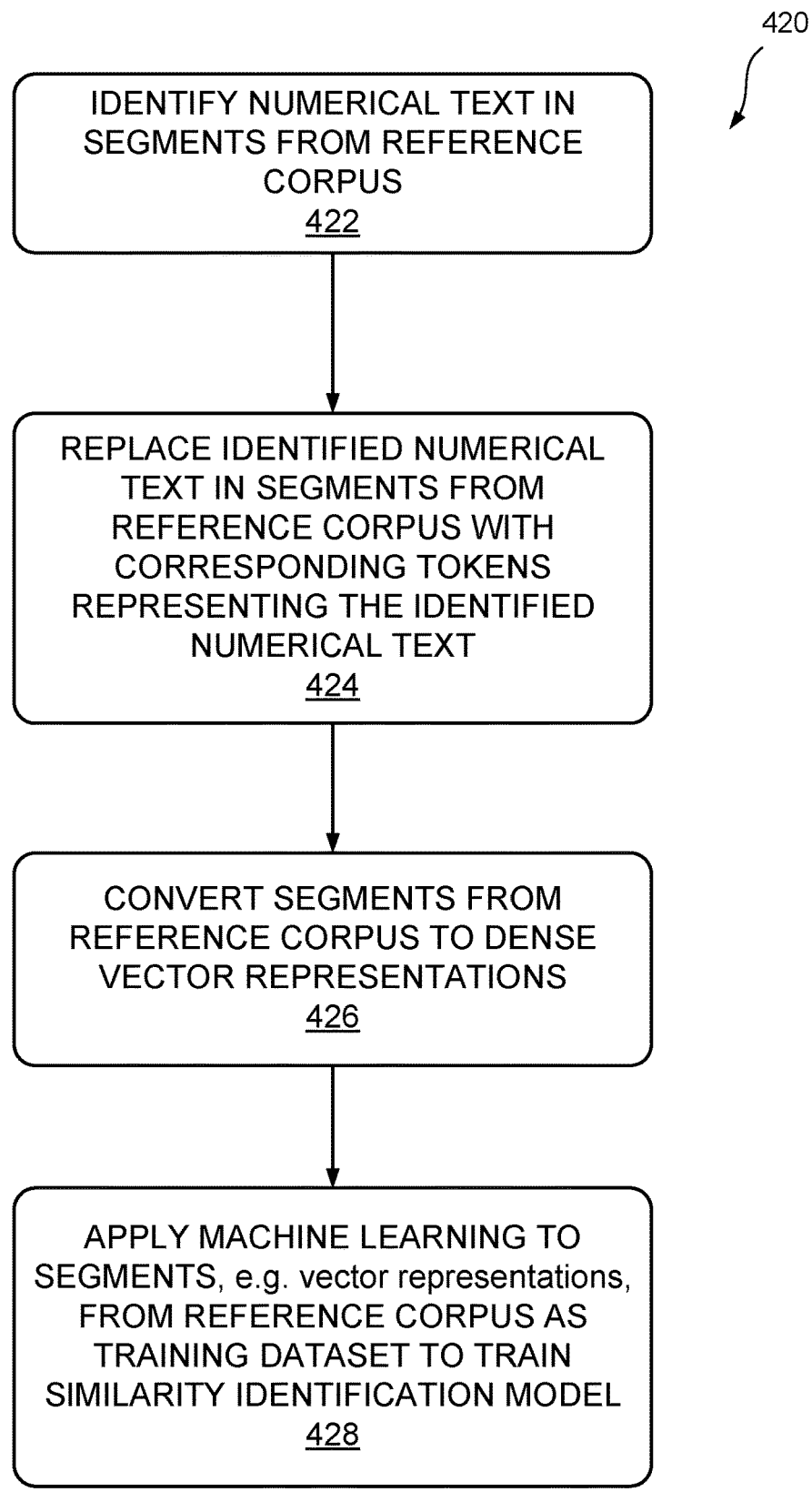
FIG. 4C is a control flow diagram illustrating an example of a process for training a similarity identification model using a reference corpus in accordance with aspects of the technology described herein.
Figure 4D:
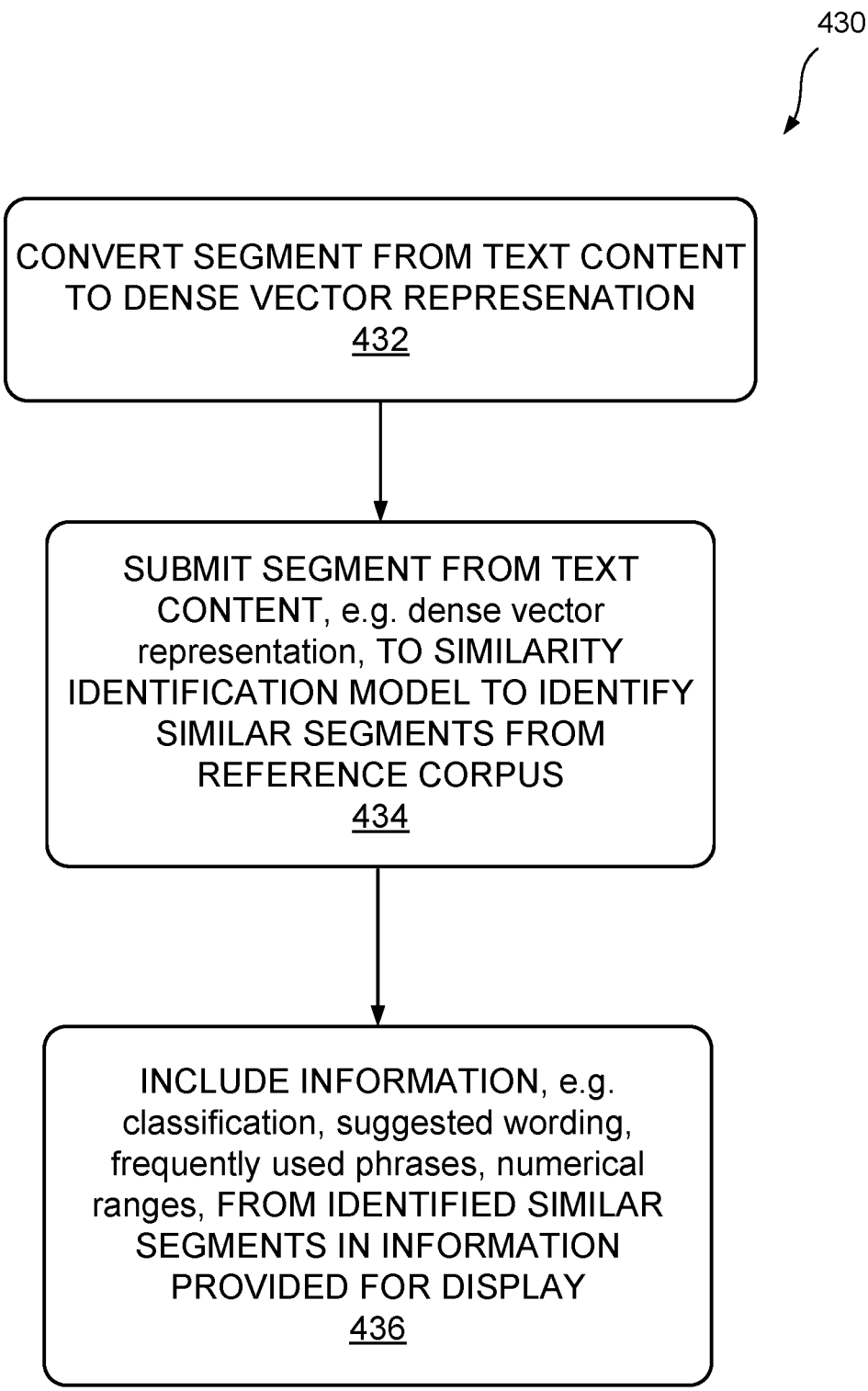
FIG. 4D is a control flow diagram illustrating an example of a process for identifying similar segments using a similarity identification model in accordance with aspects of the technology described herein.

FIG. 4C is a control flow diagram illustrating an example of a process 420 for training a similarity identification model using an augmented reference corpus in accordance with some aspects of the disclosed technology. As described elsewhere herein, a reference corpus can be augmented by replacing numerical text in the reference corpus with corresponding tokens. The augmented reference corpus can be utilized to train a similarity identification model using ML techniques.

At 422, numerical text, such as dates, paragraph numbers, amounts or numerical ranges, can be identified in the segments of the reference corpus and, at 334, the identified numerical text in the reference corpus is replaced with tokens corresponding to the numerical text. In some examples, at 426, the segments of the reference corpus can be converted to dense vector representations. At 428, one or more ML techniques are applied to the converted reference corpus, which is used as a training dataset to train a similarity identification model.

Thereafter, as described herein with respect to FIGS. 3A and 3C, text segments from the text content having tokens corresponding to numerical text can be converted to dense vector representation and submitted to the similarity identification model trained using the dense vector representation reference corpus to identify and/or score segments of the reference corpus that are similar to the text segment of the text content.

The processes described herein are intended to be merely exemplary and not limiting. Further, the examples described can be modified and still be in accordance with one or more aspects of the disclosed technology. In addition, operations or portions of some of the processes described herein can be combined with or omitted from other processes described herein and remain in accordance with aspects of the disclosed technology.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 5:
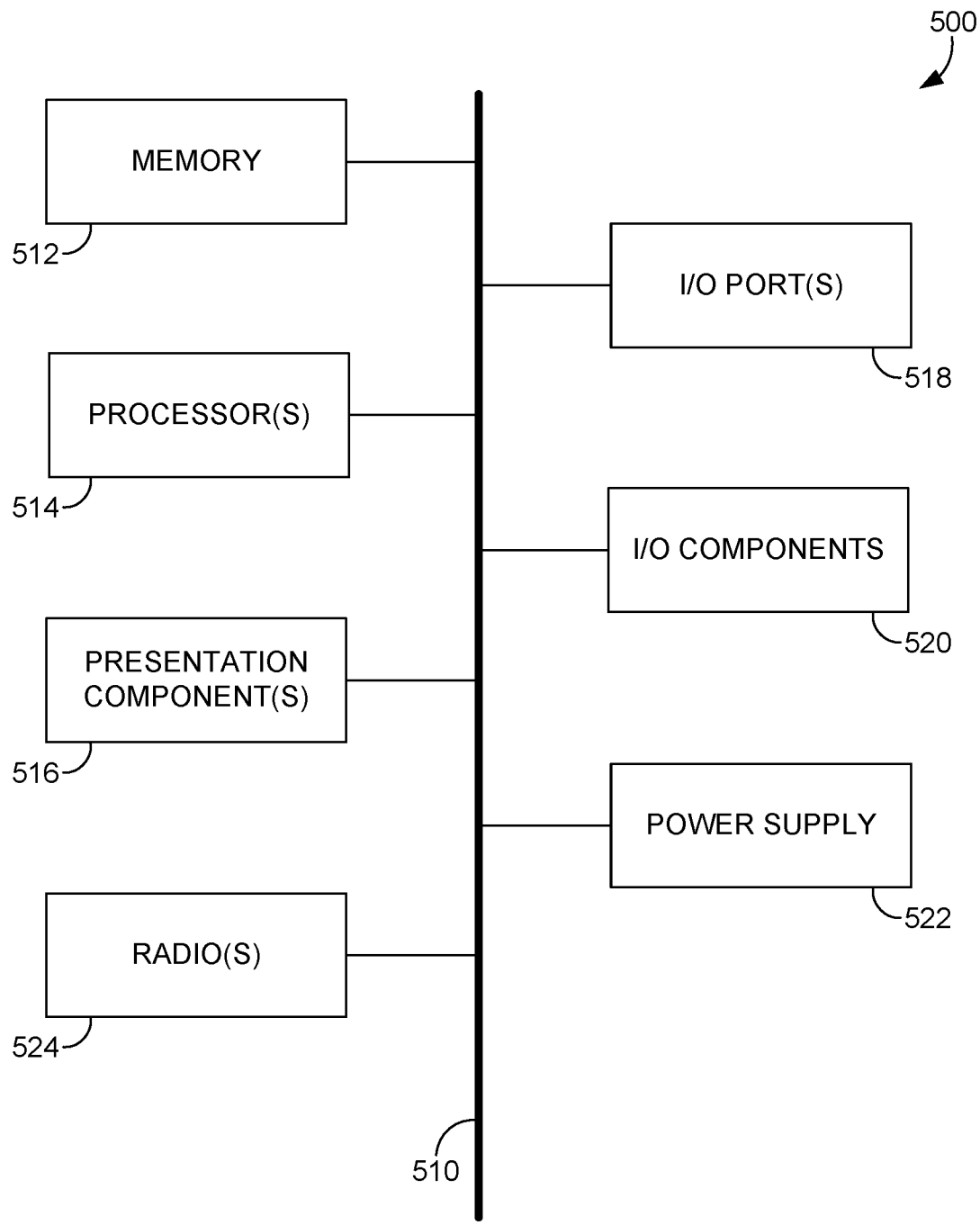
FIG. 5 is a computer architecture diagram illustrating an illustrative computer hardware and software architecture for a computing system capable of implementing aspects of the techniques and technologies presented herein.

Referring to the drawings in general, and initially to FIG. 5 in particular, an exemplary operating environment for implementing aspects of the technology described herein is shown and designated generally as computing device 500. Computing device 500 is just one example of a suitable computing environment and is not intended to suggest any limitation as to the scope of use or functionality of the technology described herein. Neither should the computing device 500 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 5, computing device 500 includes a bus 510 that directly or indirectly couples the following devices: memory 512, one or more processors 514, one or more presentation components 516, input/output (I/O) ports 518, I/O components 520, an illustrative power supply 522, and a radio(s) 524. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 5 is merely illustrative of an exemplary computing device that can be used in connection with one or more aspects of the technology described herein. Distinction is not made between such categories as "workstation," "server," "laptop," and "handheld device," as all are contemplated within the scope of FIG. 5 and refer to "computer" or "computing device."

Computing device 500 typically includes a variety of computer-readable media. Computer-readable media can be any available media that can be accessed by computing device 500 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 512 includes computer storage media in the form of volatile and/or nonvolatile memory. The memory 512 may be removable, non-removable, or a combination thereof. Exemplary memory includes solid-state memory, hard drives, and optical-disc drives. Computing device 500 includes one or more processors 514 that read data from various entities such as bus 510, memory 512, or I/O components 520. Presentation component(s) 516 present data indications to a user or other device. Exemplary presentation components 516 include a display device, speaker, printing component, and vibrating component. I/O port(s) 518 allow computing device 500 to be logically coupled to other devices including I/O components 520, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 514 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 500. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

A computing device may include radio(s) 524. The radio 524 transmits and receives radio communications. The computing device may be a wireless terminal adapted to receive communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive.

What is claimed is:

1. A method for assisted review of a document, the method comprising:
   identifying two or more similar reference text segments, from a reference corpus of text content, that are similar to a text segment of the document by:
      converting the text segment to a dense vector representation of the text segment after replacing numerical text in the text segment with a corresponding token representing the numerical text;
      converting reference text segments from the reference corpus to corresponding dense vector representations of the reference text segments after replacing corresponding numerical text in the reference text segments with corresponding tokens representing the corresponding numerical text;
      computing corresponding similarity scores between the dense vector representation of the text segment and the corresponding dense vector representations of the reference text segments using a machine learning model trained using the reference corpus to identify similar text segments; and
   subsequent to determining the two or more similar reference text segments based on each corresponding similarity score between the dense vector representation to the corresponding dense vector representations above a threshold level of similarity:
      accessing the corresponding numerical text from each of the two or more similar reference text segments; and
      determining a computed numerical value from the two or more similar reference text segments based on computing at least one of an average value, a median value, minimum value, or a maximum value of the corresponding numerical text from each of the two or more similar reference text segments; and
   providing information for the text segment for display on a user interface, the information including the computed numerical value from the two or more similar reference text segments.

2. The method of claim 1, further comprising:
   training the machine learning model by converting the reference text segments to the corresponding dense vector representations after replacing the corresponding numerical text in the reference text segments with the corresponding tokens representing the numerical text.

3. The method of claim 1, further comprising:
   further providing the information for the text segment for display on the user interface, wherein the information comprises a corresponding textual portion of at least one of the two or more similar segments that differ from the text segment to provide suggested language.

4. The method of claim 1, further comprising:
   mapping an alias to a subject token mapped to a subject from the document;
   associating the text segment from the document to the subject from the document based on identifying the alias in the text segment; and
   providing the information for the text segment associated with the subject for display on the user interface.

5. The method of claim 1, further comprising:
   mapping an alias to a subject token mapped to a subject from the document;
   associating the text segment from the document to the subject from the document based on identifying the alias in the text segment;
   computing the corresponding similarity scores by converting the text segment to the dense vector representation after replacing the alias in the text segment with the subject token; and
   providing the information for the text segment associated with the subject for display on the user interface.

6. The method of claim 1, further comprising:
   accessing the document, wherein the document comprises a contract;
   mapping an alias to a subject token mapped to a subject after identifying the subject from a preamble of contract;
   associating the text segment from the document to the subject from the document based on identifying the alias in the text segment; and
   providing the information for the text segment associated with the subject for display on the user interface.

7. The method of claim 1, further comprising:
   mapping an alias to a subject token mapped to a subject from the document;
   associating the text segment from the document to the subject from the document based on identifying the alias in the text segment;
   classifying the text segment with a content type value corresponding to a relation of the text segment to the subject; and
   providing the information for the text segment associated with the subject for display on the user interface, wherein the information includes a representation of the content type value for the text segment.

8. The method of claim 1, further comprising:
   mapping an alias to a subject token mapped to a subject from the document;

associating the text segment from the document to the subject from the document based on identifying the alias in the text segment;

classifying the text segment with a content type value corresponding to a relation of the text segment to the subject, the content type value corresponding to the relation of the text segment to the subject comprises one of an obligation type value indicating an obligation of the subject, a prohibition type indicating a prohibition of the subject, and an entitlement type indicating an entitlement of the subject; and providing the information for the text segment associated with the subject for display on the user interface, wherein the information includes a representation of the content type value for the text segment.

9. One or more non-transitory computer-readable media having computer executable instructions stored thereon which, when executed by one or more processors, cause the one or more processors to execute operations comprising:

identifying two or more similar reference text segments, from a reference corpus of text content, that are similar to a text segment of the document by:

converting the text segment to a dense vector representation of the text segment after replacing numerical text in the text segment with a corresponding token representing the numerical text;

converting reference text segments from the reference corpus to corresponding dense vector representations of the reference text segments after replacing corresponding numerical text in the reference text segments with corresponding tokens representing the corresponding numerical text;

computing corresponding similarity scores between the dense vector representation of the text segment and the corresponding dense vector representations of the reference text segments using a machine learning model trained using the reference corpus to identify similar text segments; and subsequent to determining the two or more similar reference text segments based on each corresponding similarity score between the dense vector representation to the corresponding dense vector representations above a threshold level of similarity:

accessing the corresponding numerical text from each of the two or more similar reference text segments; and determining a computed numerical value from the two or more similar reference text segments based on computing at least one of an average value, a median value, minimum value, or a maximum value of the corresponding numerical text of each of the two or more similar reference text segments; and providing information for the text segment for display on a user interface, the information including the computed numerical value from the two or more similar reference text segments.

10. The method of claim 9, further comprising:

training the machine learning model by converting the reference text segments to the corresponding dense vector representations after replacing the corresponding numerical text in the reference text segments with the corresponding tokens representing the numerical text.

11. The computer-readable media of claim 9, the operations further comprising:

further providing the information for the text segment for display on the user interface, wherein the information comprises a corresponding textual portion of at least one of the two or more similar segments that differ from the text segment to provide suggested language.

12. The computer-readable media of claim 9, the operations further comprising:

mapping an alias to a subject token mapped to a subject from the document;

associating the text segment from the document to the subject from the document based on identifying the alias in the text segment; and providing the information for the text segment associated with the subject for display on the user interface.

13. The computer-readable media of claim 9, the operations further comprising:

mapping an alias to a subject token mapped to a subject from the document;

associating the text segment from the document to the subject from the document based on identifying the alias in the text segment;

computing the corresponding similarity scores by converting the text segment to the dense vector representation after replacing the alias in the text segment with the subject token; and providing the information for the text segment associated with the subject for display on the user interface.

14. The computer-readable media of claim 9, the operations further comprising:

accessing the document, wherein the document comprises a contract;

mapping an alias to a subject token mapped to a subject after identifying the subject from a preamble of contract;

associating the text segment from the document to the subject from the document based on identifying the alias in the text segment; and providing the information for the text segment associated with the subject for display on the user interface.

15. The computer-readable media of claim 9, the operations further comprising:

mapping an alias to a subject token mapped to a subject from the document;

associating the text segment from the document to the subject from the document based on identifying the alias in the text segment;

classifying the text segment with a content type value corresponding to a relation of the text segment to the subject; and providing the information for the text segment associated with the subject for display on the user interface, wherein the information includes a representation of the content type value for the text segment.

16. The computer-readable media of claim 9, the operations further comprising:

mapping an alias to a subject token mapped to a subject from the document;

associating the text segment from the document to the subject from the document based on identifying the alias in the text segment;

classifying the text segment with a content type value corresponding to a relation of the text segment to the subject, the content type value corresponding to the relation of the text segment to the subject comprises one of an obligation type value indicating an obligation of the subject, a prohibition type indicating a prohibition of the subject, and an entitlement type indicating an entitlement of the subject; and providing the information for the text segment associated with the subject for display on the user interface, wherein the information includes a representation of the content type value for the text segment.

17. A system for identifying atypical text in a natural language text document, the system comprising:
one or more processors; and
one or more memory devices in communication with the one or more processors, the one or more processors to execute operations comprising:
identifying two or more similar reference text segments, from a reference corpus of text content, that are similar to a text segment of the document by:
converting the text segment to a dense vector representation of the text segment after replacing numerical text in the text segment with a corresponding token representing the numerical text;
converting reference text segments from the reference corpus to corresponding dense vector representations of the reference text segments after replacing corresponding numerical text in the reference text segments with corresponding tokens representing the corresponding numerical text;
computing corresponding similarity scores between the dense vector representation of the text segment and the corresponding dense vector representations of the reference text segments using a machine learning model trained using the reference corpus to identify similar text segments; and
subsequent to determining the two or more similar reference text segments based on each corresponding similarity score between the dense vector representation to the corresponding dense vector representations above a threshold level of similarity;
accessing the corresponding numerical text from each of the two or more similar reference text segments; and
determining a computed numerical value from the two or more similar reference text segments based on computing at least one of an average value, a median value, minimum value, or a maximum value of the corresponding numerical text of each of the two or more similar reference text segments; and
providing information for the text segment for display on a user interface, the information including the computed numerical value from the two or more similar reference text segments.

18. The system of claim 17, the operations further comprising:
training the machine learning model by converting the reference text segments to the corresponding dense vector representations after replacing the corresponding numerical text in the reference text segments with the corresponding tokens representing the numerical text.

* * * * *